UNITED STATES PATENT OFFICE.

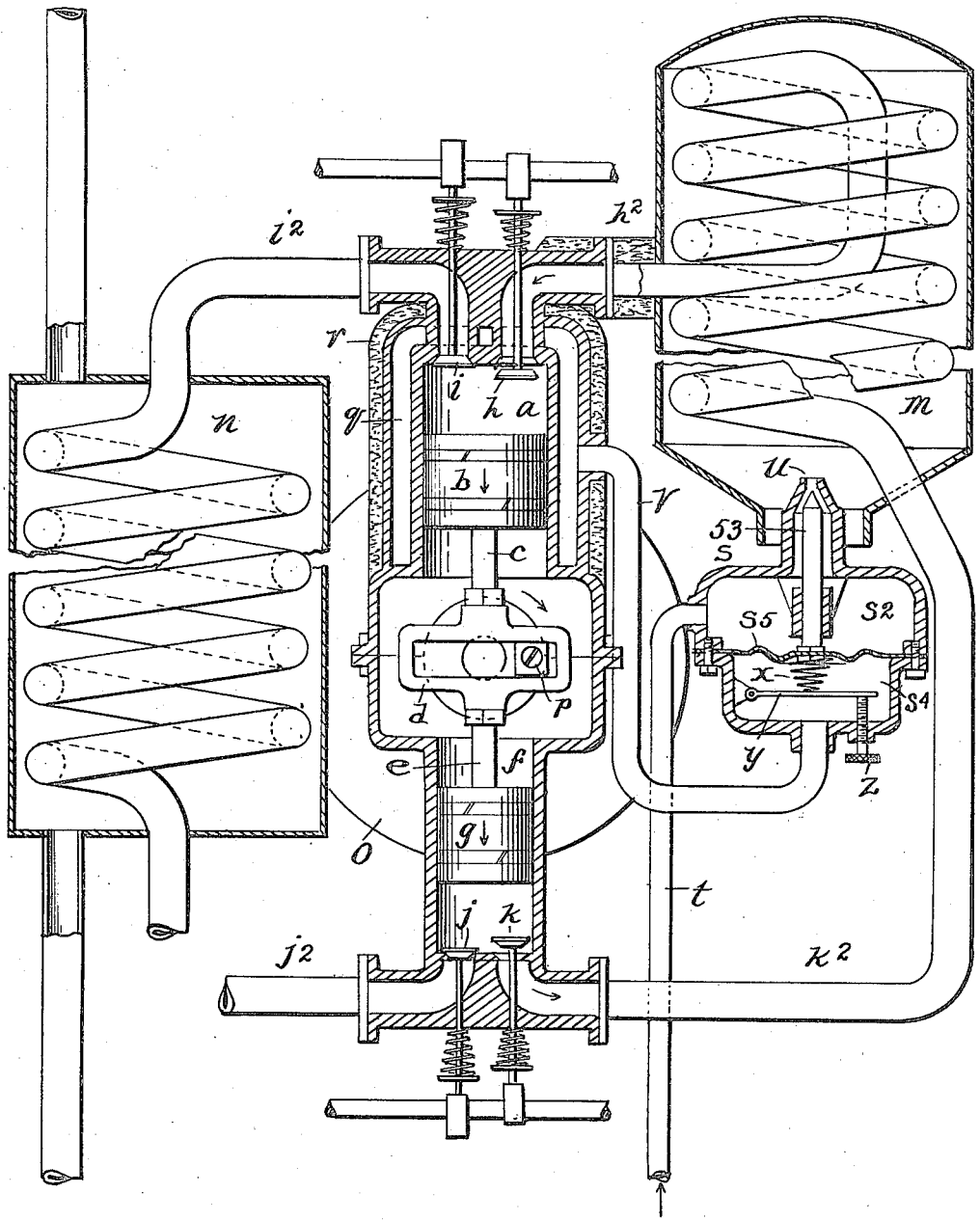

ELLIOTT J. STODDARD, OF DETROIT, MICHIGAN.

PRIME MOVER.

1,306,865. Specification of Letters Patent. Patented June 17, 1919.

Application filed February 28, 1916. Serial No. 80,802.

*To all whom it may concern:*

Be it known that I, ELLIOTT J. STODDARD, a citizen of the United States, residing at Detroit, county of Wayne, State of Michigan, have invented a certain new and useful Improvement in Prime Movers, and declare the following to be a full, clear, and exact description of the same, such as will enable others skilled in the art to which it pertains to make and use the same, reference being had to the accompanying drawings, which form a part of this specification.

My invention relates to prime movers and the object of my improvements is to provide a strong and compact heat engine with exterior heating.

In recent years the steam engine has been made so powerful and compact that it could be used for propelling a vehicle and the internal combustion engine has also been made so powerful and compact that it was serviceable for this purpose. The object of my improvements is to make the hot air, or so-called caloric, engine sufficiently powerful and compact to be used for vehicle propulsion and other similar purposes.

I secure this object in the apparatus shown and illustrated in the accompanying drawing and by the method hereinafter described, it being understood that the invention may be embodied in various forms of apparatus and that the one shown is for convenience of illustrating only.

In the figure $a$ is the working cylinder having an intake valve $h$ and discharge valve $i$. $b$ is the piston reciprocating in the cylinder $a$. $c$ is a piston rod and I have shown this rod connected by a Scotch yoke through a crank $p$ and fly wheel $o$ in the usual way. $f$ is a pump cylinder and $g$ is the piston reciprocating therein. $e$ is a piston rod extending from the piston $g$ and connected to the Scotch yoke $d$ axially in line with the piston rod $c$. $j$ is the intake valve to the cylinder $f$ and $k$ is the discharge valve.

$q$ is a chamber or jacketed space surrounding the cylinder $a$, and $r$ is a covering of heat insulating material over the wall of the jacket $q$.

$m$ is an air heating apparatus consisting in this instance of a coil of pipe inclosed in a hood to secure a better application of heat to said coils.

$u$ is an orifice through which inflammable material is supplied to maintain a flame adjacent to such opening for heating the pipe $m$.

$s$ is a casing divided into two compartments $s^2$ and $s^4$ by a flexible diaphragm $s^5$. $s^3$ is a needle valve connected at the center of the diaphragm $s^5$ and adapted to regulate the openings through the orifice $u$.

$v$ is a pipe joining the chamber $q$ with the chamber $s^4$, and $t$ is a supply pipe for inflammable material to be supplied for the maintenance of the flame above the orifice $u$.

The pipe $t$ communicates with the chamber $s^2$ of the casing $s$.

The heating coils $m$ communicate with the intake valve $h$ to the cylinder $a$ through a pipe $h^2$.

$n$ is a cooler consisting in this case of a coil of pipes inclosed in a casing through which casing cooling material is passed, such as water.

$i^2$ is a pipe forming a conduit connecting the port of the discharge valve $i$ with the cooling coil $n$. $j^2$ is a pipe connecting the coil $n$ with the intake valve to the cylinder $f$. $k^2$ is a pipe connecting the port of the discharge valve $k$ with the heating coil $m$.

I have indicated the valves $h$ and $i$, and $j$ and $k$ as mechanically operated which I belive to be the preferred forms. I have not shown in detail the valve operating mechanism.

$x$ is a spring below the diaphragm $s^5$ and $y$ is a lever upon which the lower end of the spring $x$ bears. $z$ is a set screw by which the lever $y$ may be adjusted and therefore the tension of the spring $x$ may be regulated.

The operation of the above described device is as follows:

A material adapted to be expanded and contracted in proportion to its temperature is placed in the chambers $q$ and $s^4$ and communicating pipe $v$, and the tension of the spring $x$ is regulated so that when the cylinder $a$ and consequently the material in the jacket $q$ is heated to the maximum at which it may be safely operated, that is to say, usually the maximum temperature at which an efficient lubrication of the cylinder $a$ may be maintained, the diaphragm $s^5$ will be forced upward and the supply of fuel to the orifice $u$ will be stopped or suitably checked. Then air at a high pressure, say about five hundred pounds per square inch, is forced into the receptacle $m$ and heated therein and is admitted in the usual way through the valve $h$ to actuate the piston $d$ and is then discharged into the cooler $n$ and after its temperature has fallen it is taken into the pump $s$ through the intake valve $j$ and again compressed and forced back into the receptacle $m$ through the valve $k$ and pipe $k^2$. These connections form a closed system.

A temperature of about six hundred degrees Fahr. may be maintained in the cylinder $a$ and this temperature will be automatically maintained by the above described apparatus.

The temperature may be reduced to about sixty-two degrees in the cooler $n$.

The high pressure air is admitted to the cylinder $a$ and forces the piston $b$ downward for about half its stroke, this air is then shut off and expanded until its pressure drops to say two hundred and fifty pounds. It is then expelled to the cooler and its temperature reduced to its lower limit and it is then taken into the compressor and re-compressed and transferred to the receptacle $m$.

It will be observed that this engine may be run rapidly as the air may be gradually heated as it passes through the receptacle $m$.

Of course, the precise intervals of admission and expansion and discharge are not essential to the working cylinder, as the high temperatured and highly compressed air might be admitted for the entire stroke or any portion thereof.

The receptacles $m$ and $n$ should be quite large so that the pressures in them shall not vary materially in the operation of the engine and the air will remain in them for a sufficient interval to be fully heated and cooled.

I have not tried to illustrate definitely the relative sizes of the working and compression cylinder nor the intervals of admission and expansion in the respective cylinders, as these would vary for different requirements and according to the judgment of designers and the approximate proportions are matters of elementary engineering calculations.

With the temperatures assumed and an expansion of two to one in pressure I have calculated the compression cylinder to have a volume of about six-tenths to that of the working cylinder. If the air is admitted to the working cylinder throughout the entire stroke the volume of the compression cylinder would be about half that of the working cylinder.

It will be seen that in the above described device the rate of application of the heat is regulated to conform to the demand upon the engine inasmuch as if there is a greater load on the engine there will be a tendency for the temperature of the air passing to the working cylinder to fall and consequently increase the flow of fuel to the burner and if the demand is less a contrary effect will be produced. Thus the rate of supplying heat is adapted to a fluctuating load on the engine. That is to say, a load which is in its nature variable from moment to moment such as is met with in automobile practice.

What I claim is:

1. In a caloric engine, a closed system, air under compression in said system, a working cylinder and a compression cylinder in said system, and automatically regulated means for raising the temperature of the air as it passes from the compression cylinder to the working cylinder so that it shall not have risen beyond a predetermined temperature when it passes to the working cylinder.

2. In a caloric engine, a closed system, air under compression in said system, a working cylinder and a compression cylinder in said system, and means for gradually heating and cooling the air passing through said system, and means for limiting the working cylinder to a predetermined temperature.

3. In a caloric engine, a closed system, air under compression in said system, a working cylinder and a compression cylinder in said system, and means for gradually heating and cooling the air passing through said system, and means for automatically limiting the working cylinder to a predetermined temperature.

4. In a caloric engine, a closed system, a working cylinder, means for heating and cooling the air passing through said system, a compression cylinder, and means for limiting said working cylinder to a predetermined temperature.

5. In a caloric engine, a closed system, means for heating and cooling the air in said system, material adapted to be expanded by an increase in temperature surrounding the working cylinder, and a heating apparatus, and means connecting said material with said heating apparatus to regulate the degree to which the air supplied to the cylinder is heated.

6. In a caloric engine, a closed system, a working cylinder, means for heating and cooling the air passing through said system, a compression cylinder, and an automatic means controlled by the temperature of the air adjacent to the working cylinder for controlling the temperature of such air.

7. In a caloric engine, a closed system, air under compression in said system, a working cylinder and a compression cylinder in said system, and automatically regulated means for raising the temperature of the air as it passes from the compression cylinder to the working cylinder so that it shall not have risen beyond a predetermined temperature when it passes to the working cylinder, and means for adjusting said automatically regulated means.

In testimony whereof, I sign this specification.

ELLIOTT J. STODDARD.